United States Patent [19]
Ito et al.

[11] Patent Number: 5,979,031
[45] Date of Patent: Nov. 9, 1999

[54] METHOD OF MANUFACTURING METAL ROTOR FOR TRIMMER CAPACITOR

[75] Inventors: Kunio Ito, Takefu; Hiroyuki Kishishita; Yukinori Ueda, both of Fukui-ken, all of Japan

[73] Assignee: Murata Manufacturing Co., Ltd., Japan

[21] Appl. No.: 08/782,041

[22] Filed: Jan. 10, 1997

[30] Foreign Application Priority Data

Jan. 11, 1996 [JP] Japan ................................ 8-002744

[51] Int. Cl.⁶ ............................ H01G 7/00; H02K 15/00
[52] U.S. Cl. .................. 29/25.41; 29/25.42; 29/592.1; 29/596; 29/598
[58] Field of Search .................................. 361/293, 292, 361/298.3, 278; 438/677; 29/25.41, 25.42, 598, 596, 592.1; 338/163

[56] References Cited

U.S. PATENT DOCUMENTS 3,761,860 9/1973 Ogasawara et al. ................ 338/262
4,389,696 6/1983 Azuchi et al. ...................... 361/293

*Primary Examiner*—Ponnathapura Achutamurthy
*Assistant Examiner*—P. Ponnaturi
*Attorney, Agent, or Firm*—Ostrolenk, Faber, Gerb & Soffen, LLP

[57] ABSTRACT

Manufacture of a metal rotor for a trimmer capacitor using cold forging or casting conventionally requires a metal mold to be exclusively used for the metal rotor, which incurs costs associated with the fabrication and maintenance of the mold. According to the invention, however, a metal rotor can be obtained by etching instead of cold forging or casting. Specifically, a metal plate is provided which has a principal surface with a predetermined degree of smoothness for a surface of a rotor electrode. The metal plate is selectively etched using resists, to form a step portion, a driver groove and a circumferential surface for the rotor electrode, which are the components of the metal rotor.

15 Claims, 4 Drawing Sheets

METHOD OF MANUFACTURING METAL ROTOR FOR TRIMMER CAPACITOR

BACKGROUND OF THE INVENTION

1. Field of the Invention

The present invention relates to a method of manufacturing a metal rotor which may be rotated to adjust the capacitance of a trimmer capacitor.

2. Description of Related Art

FIG. 6 is a sectional view of an example of a known trimmer capacitor which is of background interest to the present invention.

The illustrated trimmer capacitor 1 is of a surface mountable type and its principal components are a stator 2, a metal rotor 3, a metal cover 4 and a spring washer 5.

The stator 2 is constituted by a ceramic dielectric material and incorporates stator electrodes 6 and 7 formed in parallel. Terminals 8 and 9 constituted by conductive films are formed on opposite sides of the stator 2 to be electrically connected to the stator electrodes 6 and 7, respectively. Thus, the stator 2 has a symmetrical structure. This is advantageous in that there is no need for paying attention to the direction of the stator 2 when the trimmer capacitor 1 is assembled. In the case shown in FIG. 6, the stator electrode 7 or the terminal 9 associated therewith may be deleted.

The metal rotor 3 is provided on the stator 2. The metal rotor 3 is shown also in FIGS. 7 and 8. FIGS. 7 and 8 show the metal rotor 3 as viewed from the side of an upper surface 10 and a lower surface 11 thereof, respectively.

The metal rotor 3 has the upper surface 10, the lower surface 11 and a circumferential surface 12 which connects them. As clearly shown in FIG. 8, a surface of a rotor electrode 14 is formed by a surface of a step portion 13 which projects in a semicircular configuration from a part of the lower surface 11. Further, a projecting portion 15 substantially equal in height to the step portion 13 is formed also on the lower surface 11 to prevent tilting of the metal rotor 3 as a result of the formation of the step portion 13. On the other hand, as clearly shown in FIG. 7, a driver groove 16 is formed on the upper surface of the metal rotor 3.

The above-described metal rotor 3 is rotatably contained in the metal cover 4. The metal cover 4 has a configuration suitable for rotatably containing the rotor 3 therein and is secured to the stator 2 by being partially engaged with the stator 2. On an upper surface of the metal cover 4, an adjustment hole 17 is provided for exposing the driver groove 16 of the metal rotor 3. The peripheral portion of this adjustment hole 17 is slightly inclined in a conical configuration to exert a spring action on the metal rotor 3. The metal cover 4 is also formed with a terminal 18 which extends to the lower end of the circumferential surface of the stator 2. This terminal 18 may be soldered to the terminal 9 of the stator 2.

A spring washer 5 is disposed between the upper surface 10 of the metal rotor 3 and the peripheral portion of the adjustment hole 17 on the metal cover 4 and is inclined, for example, in a conical configuration to exert a spring action on the metal rotor 3.

In the trimmer capacitor 1 having such a configuration, the spring action provided by the peripheral portion of the adjustment hole 17 on the metal cover 4 and the spring washer 5 urges the metal rotor 3 against the stator 2 to provide stable contact between the metal rotor 3 and the stator 2. This stabilizes the torque of the metal rotor 3 and the capacitance formed between the stator electrode 6 and rotor electrode 14. This capacitance is drawn out through the terminal 8 which is electrically connected to the stator electrode 6 and through the terminal 18 provided on the metal cover which is electrically connected through the spring washer 5 to the metal rotor 3 forming the rotor electrode 14.

The above-described metal rotor 3 is normally manufactured from a copper alloy by means of cold forging or from a zinc alloy by means of casting. However, cold forging or casting requires a metal mold to be exclusively used for the metal rotor 3. Therefore, such an operation not only requires a high initial cost but also incurs costs associated with a reduction of the life of the metal mold because it applies a relatively high load to the metal mold during processing. In addition, a rotor electrode 14 on a metal rotor 3 which has been just obtained using such a process has surface roughness and waviness as large as several tens of $\mu$m or more, while the surface roughness and waviness normally required for a metal rotor 3 of a trimmer capacitor 1 is 5 $\mu$m or less. The surface roughness and waviness of a metal rotor 3 is preferably as small as possible because the capacitance becomes more stable the smaller the surface roughness and waviness.

Therefore, a metal rotor 3 obtained using cold forging or casting as described above must be subjected to surface grinding using a lapping machine or the like as a post-treatment to reduce the surface roughness and waviness of the rotor electrode 14. However, in such a surface grinding process, the metal rotor 3 must be arranged on the lapping machine or the like at an orientation with the surface of the rotor electrode 14 in contact with the machine. Further, the depth of grinding must be adjusted, which involves relatively complicated and costly operations.

It is therefore an object of the present invention to provide an economical and efficient method of manufacturing a metal rotor for a trimmer capacitor which does not involve cold forging or casting as described above.

SUMMARY OF THE INVENTION

The present invention is directed to a method of manufacturing a metal rotor for a trimmer capacitor which has upper and lower surfaces and a circumferential surface connecting the upper and lower surfaces and in which a surface of a rotor electrode is formed by a surface of a step portion projecting from a part of the lower surface, and in which a driver groove is formed on the upper surface. Briefly, according to an aspect of the present invention, a metal rotor is manufactured using an etching technique.

According to the present invention, a metal plate is first provided. This metal plate is selectively etched using an etching resist to form the step portion, driver groove and circumferential surface as described above.

According to the present invention, features essential for the known metal rotor such as a step portion for forming a rotor electrode surface, a driver groove and a circumferential surface are formed by means of selective etching using an etching resist as described above. This provides a first advantage in that there is no need for a metal mold which has been required when cold forging or casting is employed and therefore costs associated with such a metal mold can be eliminated.

Further, the initial smoothness of the metal plate on at least one principal surface thereof is maintained throughout the etching as described above, and such a smooth principal surface can be used as a surface for forming the resultant rotor electrode as it is.

When an additional smoothing process, such as grinding, must be performed, to provide such a principal surface of a metal plate with smoothness required for a surface of a rotor electrode, such a process is preferably performed prior to the etching process or in an intermediate stage of the etching process that precedes at least the formation of the circumferential surface of the metal rotor. By performing the smoothing process prior to the etching process or in such an intermediate stage of the etching process, the smoothing process can be carried out at this stage on the metal plate, which is larger than the metal rotor. A metal plate is easier to handle than individual metal rotors, requires no post-treatment for grinding, and can be processed efficiently. This results in a cost reduction.

If the above-described advantages are not desired, the process of achieving smoothness required for a surface of a rotor electrode may be performed after the formation of the circumferential surface of a metal rotor.

Furthermore, since the circumferential surface of a metal rotor is also formed by means of etching, a great number of metal rotors can be efficiently obtained from a relatively large metal plate. Therefore, starting with the smoothing process such as grinding, if required, up to the etching process, can be simultaneously performed for all of the great number of metal rotors that are to be obtained. This improves manufacturing efficiency, and a cost reduction can be expected also from this point of view.

In addition, the problem of work-hardening may be encountered when cold forging is carried out as in the prior art. For this reason, stainless steel and nickel silver have been regarded as materials unsuitable for forging because they are vulnerable to work-hardening, although they are preferable for their corrosion resistance. According to the present invention wherein etching is employed instead of forging, even materials significantly vulnerable to work-hardening such as stainless steel and nickel silver can be used as a material for a metal rotor. This makes it possible to improve the corrosion resistance of a metal rotor by taking advantage of the preferable corrosion resistance exhibited by stainless steel, nickel silver and the like.

As a result, the electrical characteristics of a trimmer capacitor can be improved.

Other features and advantages of the present invention will become apparent from the following description of the invention which refers to the accompanying drawings.

DETAILED DESCRIPTION OF EMBODIMENTS OF THE INVENTION

FIGS. 1A through 1F are sectional views sequentially illustrating steps included in a method of manufacturing a metal rotor for a trimmer capacitor according to an embodiment of the present invention. The present embodiment is intended for manufacture of the aforesaid metal rotor 3 shown in FIGS. 6 through 8.

Figure 1A:
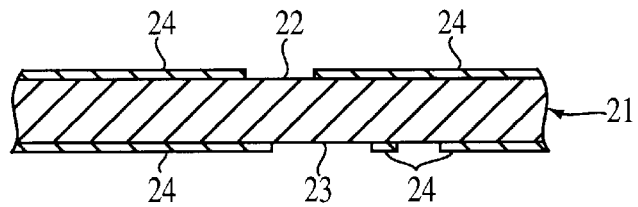
FIGS. 1A through 1F are sectional views sequentially illustrating steps included in a method of manufacturing a metal rotor for a trimmer capacitor according to an embodiment of the present invention.

As shown in FIG. 1A, a metal plate 21 is first provided through a rolling process or through rolling and grinding processes. It exhibits, on principal surfaces 22 and 23 thereof, a degree of smoothness required for a surface of a rotor electrode 14. Such smoothness is preferably a surface roughness of, for example, 5 $\mu$m or less. The metal plate 21 may be made of any material and, for example, it is possible to use stainless steel, nickel silver and the like as well as a copper alloy.

When smoothness required for the surface of the rotor electrode 14 is achieved on both principal surfaces 22 and 23 as described above, there is an advantage in that it is not necessary to distinguish the two sides of the metal plate 21 from each other at subsequent steps. If such an advantage is not desired, the required smoothness may be achieved on only one of the principal surfaces, e.g., the principal surface 23.

Next, as also shown in FIG. 1A, a first resist 24 is formed on each of the principal surfaces 22 and 23 of the metal plate 21. The first resist 24 is formed in a pattern on the principal surface 22 which is chosen to expose the region of a driver groove 16 on an upper surface 10 of a metal rotor 3 to be obtained and in a pattern on the principal surface 23 which is chosen to expose regions on a lower surface 11 of the metal rotor 3 excluding the regions of a step portion 13 and a projecting portion 15.

Figure 1B:
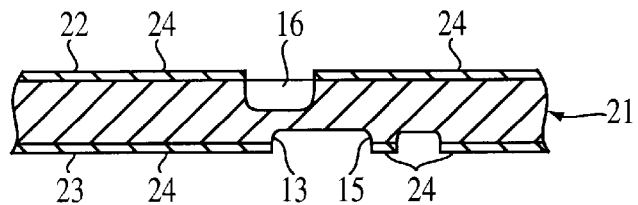

Next, half etching is performed as shown in FIG. 1B. As a result, the driver groove 16 is formed on the principal surface 22, and the step portion 13 and projecting portion 15 are formed on the principal surface 23. The depths of half etching on the principal surfaces 22 and 23 are independently determined in accordance with conditions such as the amount of the etchant and etching time.

Figure 1C:
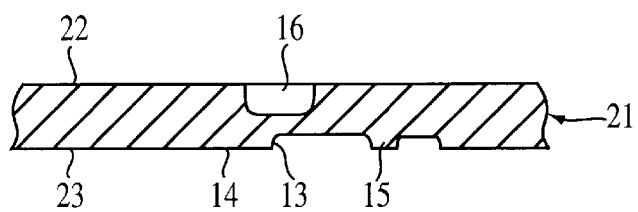

Then, the first resist 24 is removed as shown in FIG. 1C.

Figure 1D:
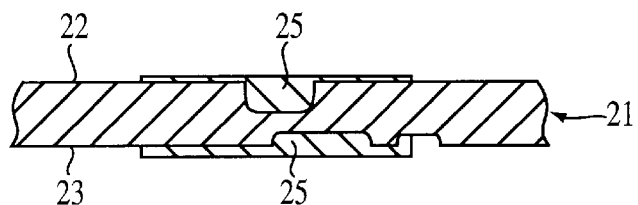

Then, as shown in FIG. 1D, a second resist 25 is formed on each of the principal surfaces 22 and 23 of the metal plate 21. The patterns in which the second resist 25 is formed correspond to the configurations of the upper surface 10 and lower surface 11 of the metal rotor 3 to be obtained.

Figure 1E:
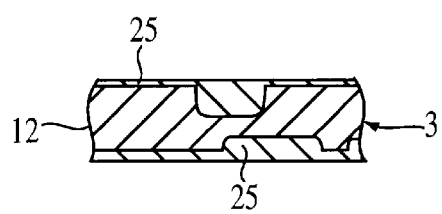

Next, as shown in FIG. 1E, etching is performed to remove regions other than the region sandwiched by the second resist 25. This etching forms a circumferential surface 12 of the metal rotor 3 to be obtained. At this stage, the configuration of the metal rotor 3 has been completed.

Figure 1F:
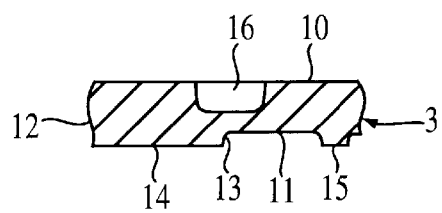

Next, the second resist 25 is removed as shown in FIG. 1F.

A desired metal rotor 3 is thus obtained. It should be noted that since the rotor electrode 14 formed by a surface of the step portion 13 is covered by the first resist 24 or second resist 25 during etching, the initial smoothness of the principal surface 23 of the metal plate 21 is maintained as it is.

When the surface of the prepared metal plate 21 is not sufficiently smooth, the step shown in FIG. 1C may be followed by a smoothing step, for providing the surface of the rotor electrode 14 with smoothness required for the rotor electrode 14 of the metal rotor 3.

FIGS. 2A through 2E are sectional views sequentially illustrating steps included in a method of manufacturing a metal rotor for a trimmer capacitor according to another embodiment of the present invention. The present embodiment is also intended for manufacture of the aforesaid metal rotor 3 shown in FIGS. 6 through 8.

Figure 2A:
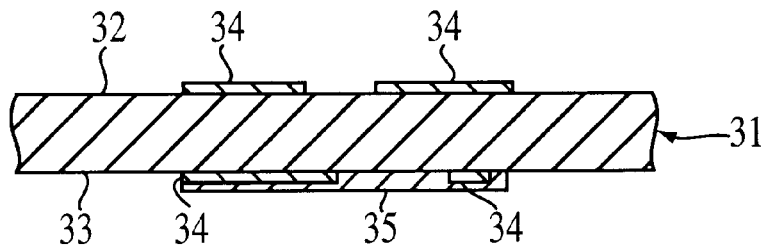
FIGS. 2A through 2E are sectional views sequentially illustrating steps included in a method of manufacturing a metal rotor for a trimmer capacitor according to another embodiment of the present invention.

As shown in FIG. 2A, a metal plate 31 is first provided. Like the above-described metal plate 21, this metal plate 31 has been obtained through a rolling process or through rolling and grinding processes and exhibits, on principal surfaces 32 and 33 thereof, smoothness required for a surface of a rotor electrode 14, e.g., surface roughness of 5 μm or less. The required smoothness may be achieved on only one of the principal surfaces, e.g., the principal surface 33.

Next, as also shown in FIG. 2A, a first resist 34 is formed on each of the principal surfaces 32 and 33 of the metal plate 31. Further, a second resist 35 is formed on the principal surface 33 so as to cover the first resist 34 formed on the principal surface 33.

The first resist 34 is formed in a pattern on the principal surface 32 which is chosen to cover regions excluding a driver groove 16 on an upper surface 10 of a metal rotor 3 to be obtained and in a pattern on the principal surface 33 which is chosen to cover the regions of a step portion 13 and a projecting portion 15 on a lower surface 11 of the metal rotor 3. The pattern in which the second resist 35 is formed corresponds to the configuration of the lower surface 11 of the metal rotor 3 to be obtained.

Figure 2B:
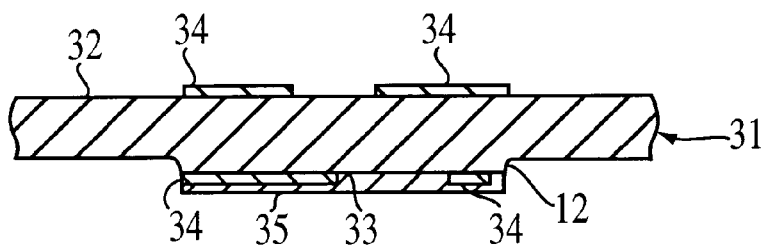

Next, as shown in FIG. 2B, half etching is performed only on the principal surface 33 of the metal plate 31. This leaves the contour of a part of a circumferential surface 12 of the metal rotor 3 to be obtained.

Figure 2C:
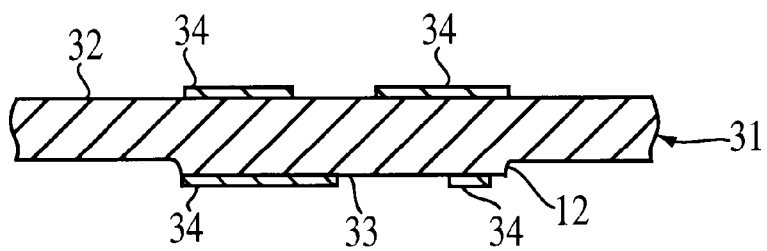

Then, as shown in FIG. 2C, only the second resist 35 is removed with the first resist 34 left over.

Figure 2D:
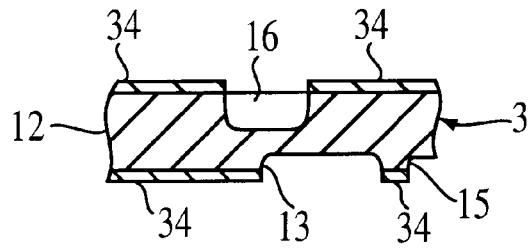

Then, etching is performed as shown in FIG. 2D. At this etching step, half etching is performed to form the driver groove 16 on the principal surface 32 and the step portion 13 and projecting portion 15 on the principal surface 33. The region which has been subjected to half etching at the step shown in FIG. 2B is further removed by this etching to completely expose the circumferential surface 12 of the metal rotor 3 to be obtained. At this stage, the configuration of the metal rotor 3 has been completed.

Figure 2E:
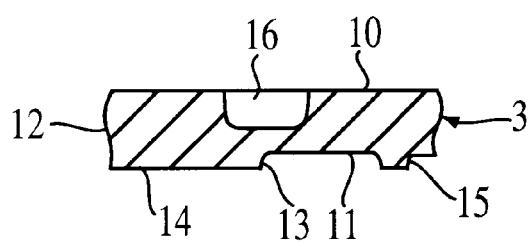

Next, the first resist 34 is removed as shown in FIG. 2E to obtain the desired metal rotor 3.

FIGS. 1A through 1F and FIGS. 2A through 2E show only a part of each of the metal plates 21 and 31. In practice, steps such as etching are performed to obtain a plurality of metal rotors 3 from each of the metal plates 21 and 31.

The procedures such as etching shown in FIGS. 1A through 1F and FIGS. 2A through 2E are only illustrative and may be further modified.

Figure 6:
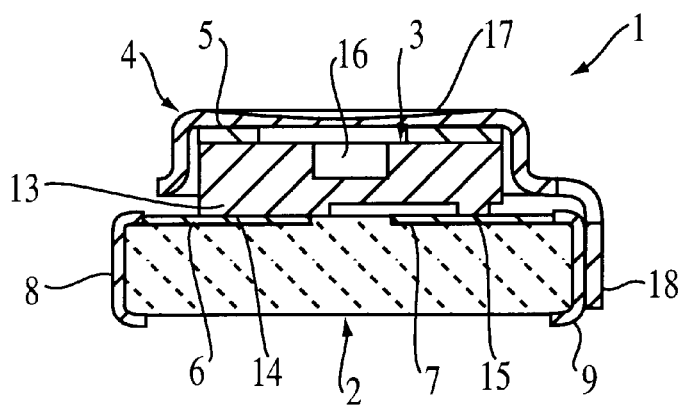
FIG. 6 is a sectional view of a known trimmer capacitor 1 which is of background interest to the present invention.
Figure 7:
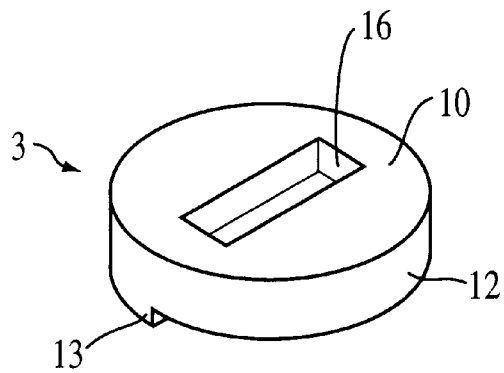
FIG. 7 is a perspective view of a metal rotor 3 included in the trimmer capacitor 1 shown in FIG. 6 as viewed alone from the side of an upper surface 10 thereof.
Figure 8:
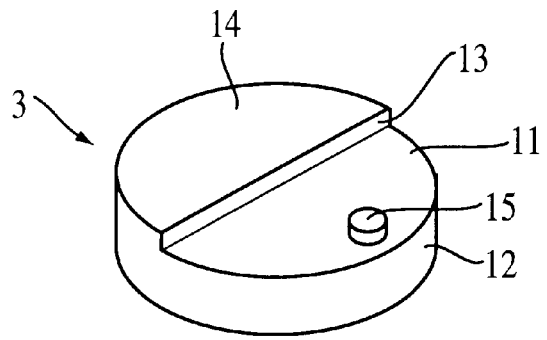
FIG. 8 is a perspective view of the metal rotor 3 shown in FIG. 7 as viewed from the side of a lower surface 11 thereof.

Metal rotors manufactured according to the method of manufacture of the present invention are not limited to those like the metal rotor 3 shown in FIGS. 6 through 8 for which the above-described embodiments are intended. Metal rotors having various configurations can be manufactured according to the present invention. Some examples will be described below with reference to the drawings.

Figure 3:
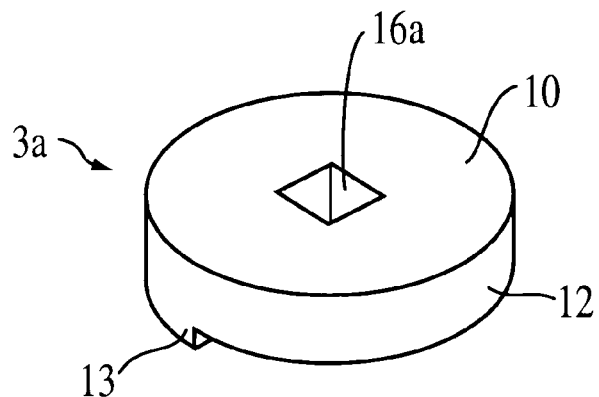
FIG. 3 is a perspective view of a metal rotor 3a as viewed from the side of an upper surface 10 thereof, showing another example of a metal rotor which can be manufactured according to the method of manufacture according to the present invention.
Figure 4:
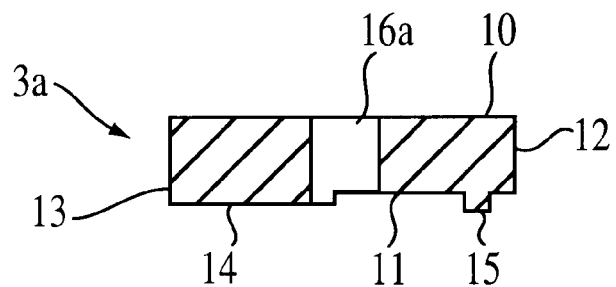
FIG. 4 is a sectional view of the metal rotor 3a shown in FIG. 3.

A metal rotor 3a shown in FIGS. 3 and 4 includes a driver groove 16a which penetrates therethrough. The configuration is otherwise substantially the same as that of the metal rotor 3 shown in FIGS. 6 through 8. Therefore, like parts are indicated by like reference numbers and will not be described again.

Figure 5:
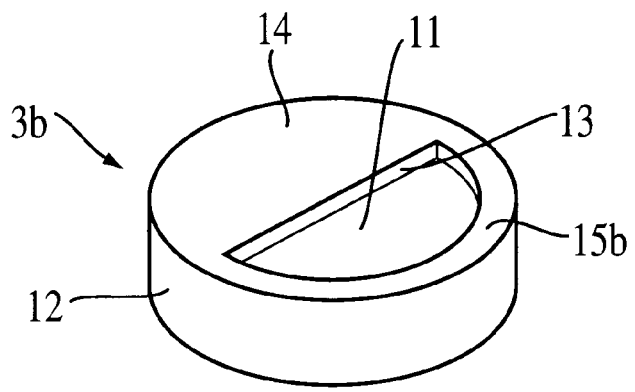
FIG. 5 is a perspective view of a metal rotor 3b as viewed from the side of a lower surface 11 thereof, showing still another example of a metal rotor which can be manufactured according to the method of manufacture according to the present invention.

A metal rotor 3b shown in FIG. 5 is formed with a projecting portion 15b which is integral with a step portion 13 and extends in the form of a half ring. The configuration is otherwise substantially the same as that of the metal rotor 3 shown in FIGS. 6 through 8. Therefore, like parts are indicated by like reference numbers and will not be described again.

Although a metal rotor 3a or 3b having such a configuration is difficult to obtain using cold forging, it can be easily manufactured using the etching process according to the present invention.

While particular embodiments of the present invention have been shown and described, it will be seen by those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces; and selectively etching said metal plate using an etching resist to form said step in said lower surface, said driver groove in said upper surface, and said circumferential surface therebetween, said rotor electrode surface being constituted by a part of said lower principal surface of said metal plate.

2. The method of manufacturing a metal rotor for a trimmer capacitor according to claim 1, further comprising the step of providing at least one of said principal surfaces of said metal plate with a predetermined degree of smoothness.

3. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces;

selectively etching said metal plate using an etching resist to form said step in said lower surface, said driver groove in said upper surface, and said circumferential surface therebetween, said rotor electrode surface being constituted by a part of said lower principal surface of said metal plate; and providing at least one of said principal surfaces of said metal plate with a predetermined degree of smoothness; wherein said degree of smoothness is a surface roughness of about 5 μm or less.

4. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces;

selectively etching said metal plate using an etching resist to form said step in said lower surface, said driver groove in said upper surface, and said circumferential surface therebetween, said rotor electrode surface being constituted by a part of said lower principal surface of said metal plate; and providing at least one of said principal surfaces of said metal plate with a predetermined degree of smoothness; wherein said step of providing at least one principal surface of the metal plate with said degree of smoothness is performed before said circumferential surface is formed.

5. The method of manufacturing a metal rotor for a trimmer capacitor according to claim 4, wherein said step of providing at least one principal surface of the metal plate with said degree of smoothness is performed before said etching step.

6. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces;

selectively etching said metal plate using an etching resist to form said step in said lower surface, said driver groove in said upper surface, and said circumferential surface therebetween, said rotor electrode surface being constituted by a part of said lower principal surface of said metal plate; and providing at least one of said principal surfaces of said metal plate with a predetermined degree of smoothness; wherein said step of providing at least one principal surface of the metal plate with said degree of smoothness is performed before said etching step.

7. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces; and selectively etching said metal plate using an etching resist to form said step in said lower surface, said driver groove in said upper surface, and said circumferential surface therebetween, said rotor electrode surface being constituted by a part of said lower principal surface of said metal plate;

wherein a smoothing step for providing said rotor electrode surface with a predetermined degree of smoothness is performed after said circumferential surface is formed.

8. The method of manufacturing a metal rotor for a trimmer capacitor according to claim 7, wherein said degree of smoothness is a surface roughness of about 5 μm or less.

9. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces; and selectively etching said metal plate using an etching resist to form said step in said lower surface, said driver groove in said upper surface, and said circumferential surface therebetween, said rotor electrode surface being constituted by a part of said lower principal surface of said metal plate;

wherein said driver groove extends partially through said metal plate.

10. The method of manufacturing a metal rotor for a trimmer capacitor according to claim 9, wherein said driver groove extends completely through said metal plate.

11. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces; and selectively etching said metal plate using an etching resist to form said step in said lower surface, said driver groove in said upper surface, and said circumferential surface therebetween, said rotor electrode surface being constituted by a part of said lower principal surface of said metal plate;

wherein said etching step further comprises the step of forming a projecting portion on said lower surface adjacent to said step.

12. The method of manufacturing a metal rotor for a trimmer capacitor according to claim 11, when said projecting portion is formed spaced away from said step.

13. The method of manufacturing a metal rotor for a trimmer capacitor according to claim 11, wherein said projecting portion is formed continuously with said step.

14. The method of manufacturing a metal rotor for a trimmer capacitor according to claim 13, wherein said projecting portion is formed along said circumferential surface.

15. A method of manufacturing a metal rotor for a trimmer capacitor, said metal rotor comprising:

an upper surface, a lower surface and a circumferential surface connecting said upper and lower surfaces, a step formed in said lower surface, a rotor electrode surface being defined by a portion of said lower surface adjacent to said step, and a driver groove being formed in said upper surface;

said method comprising the steps of:

providing a metal plate having upper and lower principal surfaces;

selectively etching said metal plate using an etching resist to form said step in said lower surface, said driver groove in said upper surface, and said circumferential surface therebetween, said rotor electrode surface being constituted by a part of said lower principal surface of said metal plate;

providing at least one of said principal surfaces of said metal plate with a predetermined degree of smoothness; and providing a second surface of said metal plate which is opposite to said at least one principal surface with said predetermined degree of smoothness.

* * * * *